(12) United States Patent
Morita

(10) Patent No.: US 10,339,868 B2
(45) Date of Patent: Jul. 2, 2019

(54) DISPLAY DRIVER, ELECTRO-OPTICAL DEVICE, AND ELECTRICAL APPARATUS

(71) Applicant: SEIKO EPSON CORPORATION, Tokyo (JP)

(72) Inventor: Akira Morita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/665,667

(22) Filed: Aug. 1, 2017

(65) Prior Publication Data

US 2018/0047339 A1    Feb. 15, 2018

(30) Foreign Application Priority Data

Aug. 10, 2016  (JP) .................................. 2016-157242

(51) Int. Cl.

| | |
|---|---|
| *G11C 7/10* | (2006.01) |
| *G09G 3/3258* | (2016.01) |
| *G06F 3/0481* | (2013.01) |
| *G09G 3/20* | (2006.01) |
| *G09G 3/3283* | (2016.01) |
| *G02F 1/00* | (2006.01) |

(52) U.S. Cl.

CPC ....... *G09G 3/3258* (2013.01); *G06F 3/04812* (2013.01); *G09G 3/2092* (2013.01); *G09G 3/3283* (2013.01); *G02F 1/0018* (2013.01); *G09G 2320/0223* (2013.01)

(58) Field of Classification Search

CPC ...... G11C 7/00; G09G 3/3258; G09G 3/2092; G09G 3/3283; G06F 3/04812
USPC ..................................................... 365/189.05
See application file for complete search history.

(56) References Cited

U.S. PATENT DOCUMENTS

| | | | | |
|---|---|---|---|---|
| 5,907,313 | A | * 5/1999 | Kubota ............... | G09G 3/3677 345/100 |
| 6,072,456 | A | * 6/2000 | Karube ............... | G09G 3/3688 345/100 |

(Continued)

FOREIGN PATENT DOCUMENTS

| | | |
|---|---|---|
| JP | 2006-011304 A | 1/2006 |
| JP | 2006-195387 A | 7/2006 |

(Continued)

*Primary Examiner* — Viet Q Nguyen
(74) *Attorney, Agent, or Firm* — Oliff PLC

(57) ABSTRACT

A display driver includes a driving circuit and a control circuit. An electro-optical panel includes plural sampling sections respectively provided for a predetermined number of plural source lines. The control circuit causes a relative time relationship between an $i^{th}$ graded output period of the driving circuit and an $i^{th}$ active period of an enable signal when a sampling operation is enabled for the $i^{th}$ sampling section to differ from a relative time relationship between a $j^{th}$ graded output period of the driving circuit and a $j^{th}$ active period of the enable signal when the sampling operation is enabled for the $j^{th}$ sampling section.

18 Claims, 9 Drawing Sheets

(56) References Cited

U.S. PATENT DOCUMENTS

| | | | | |
|---|---|---|---|---|
| 6,750,840 | B2* | 6/2004 | Morita | G09G 3/3648 |
| | | | | 345/100 |
| 6,924,061 | B1* | 8/2005 | Jow | H01M 10/052 |
| | | | | 252/62.2 |
| 7,079,127 | B2* | 7/2006 | Morita | G09G 3/2011 |
| | | | | 345/210 |
| 7,190,358 | B2* | 3/2007 | Hiroki | G09G 3/3614 |
| | | | | 345/204 |
| 7,379,045 | B2* | 5/2008 | Morita | G09G 3/2092 |
| | | | | 345/100 |
| 7,580,018 | B2* | 8/2009 | Takeda | G09G 3/3648 |
| | | | | 345/87 |
| 7,962,615 | B1* | 6/2011 | Lehr | G06F 9/524 |
| | | | | 709/224 |
| 8,354,990 | B2* | 1/2013 | John | G09G 3/3688 |
| | | | | 345/100 |
| 8,876,763 | B2* | 11/2014 | Noddin | A61M 25/1029 |
| | | | | 604/103.06 |
| 8,878,763 | B2* | 11/2014 | Igawa | G09G 5/001 |
| | | | | 345/204 |
| 9,972,235 | B2* | 5/2018 | Maruyama | G09G 3/2007 |
| 10,002,582 | B2* | 6/2018 | Morita | G09G 3/3696 |
| 10,147,359 | B2* | 12/2018 | Morita | G06F 3/04812 |
| 2005/0174306 | A1* | 8/2005 | Agari | G09G 3/3241 |
| | | | | 345/76 |
| 2006/0007208 | A1 | 1/2006 | Aoki | |
| 2009/0052001 | A1* | 2/2009 | Mochizuki | G09G 3/3688 |
| | | | | 359/259 |
| 2018/0047362 | A1* | 2/2018 | Morita | G09G 3/3688 |

FOREIGN PATENT DOCUMENTS

| | | | | |
|---|---|---|---|---|
| JP | 2006-227468 A | | 8/2006 | |
| JP | 2018025663 A | * | 2/2018 | G06F 3/04812 |

* cited by examiner

DISPLAY DRIVER, ELECTRO-OPTICAL DEVICE, AND ELECTRICAL APPARATUS

BACKGROUND

1. Technical Field

The present invention relates to a display driver, an electro-optical device, an electrical apparatus, and the like.

2. Related Art

Phase expansion driving that sequentially drives a predetermined number (several to several tens) of source lines at a time is known as a driving method for electro-optical panels. In an electro-optical panel driven by the phase expansion driving, sampling sections are provided for each predetermined number of source lines. The source lines are then driven sequentially at the predetermined number of lines at a time by the sampling section performing sampling operations sequentially (for example, from left to right along the electro-optical panel) based on an enable signal output by a display driver.

Technology related to the phase expansion driving is, for example, described in JP-A-2006-227468. In JP-A-2006-227468, the electro-optical panel includes a detection circuit that detects a delay time of a sampling signal (enable signal) with respect to a data signal. A scanning control circuit then controls so that the generation timing of the sampling signal becomes earlier as the detected delay time lengthens.

In phase expansion driving, many sampling sections are provided in parallel running along a horizontal scanning direction of an electro-optical panel, and a delay amount of an enable signal differs between the left end and the right end of the electro-optical panel (the start and end of a horizontal scanning period), since signal lines of the enable signal are disposed along the same direction. Therefore, the relative timings of an active period of the enable signal and an output period of the data signal in each sampling section may differ between the left end and the right end of the electro-optical panel. In such cases, there is a possibility that the actual driving times of the source lines at the left end and the right end of the electro-optical panel may differ, leading to a possibility that this may lower the display quality.

For example, although recently the driving times per pixel have been shortened due to advances in increasingly high resolution electro-optical panels, the driving time per pixel decreases considerably as the resolution is made higher, since the number of pixel that can be driven at once by phase expansion driving is from several pixels to several tens of pixels. When doing so, the output period of the data signal is exceedingly short, and the delay of the enable signal such as that described above therefore has a relatively large influence, making it difficult to constrain the active period of the enable signal to within the output period of the data signal at both the left end and the right end of the electro-optical panel.

Note that in JP-A-2006-227468, described above, resistance and capacitance are added to the signal lines that supply the enable signal to control the delay time of the enable signal overall. Namely, the delay time of the enable signal (within the horizontal scanning period) is not controlled in respective sampling sections of the electro-optical panel.

SUMMARY

Several aspects of the invention enable provision of a display driver, an electro-optical device, an electrical apparatus, and the like capable of adjusting in respective sampling sections the relative timings of an active period of an enable signal and an output period of a data signal.

One aspect relates to a display driver including a driving circuit that drives plural source lines of an electro-optical panel sequentially at a predetermined number of lines at a time, and a control circuit. The electro-optical panel includes plural sampling sections each provided to the predetermined number of lines of the plural source lines. The control circuit is configured to output an enable signal that enables a sampling operation of the plural sampling sections. The control circuit is configured to cause a relative time relationship between an $i^{th}$ graded output period of the driving circuit and an $i^{th}$ active period of the enable signal when the sampling operation is enabled for the $i^{th}$ sampling section of the plural sampling sections, wherein i is an integer of 1 or greater, to differ from a relative time relationship between a $j^{th}$ graded output period of the driving circuit and a $j^{th}$ active period of the enable signal when a sampling operation is enabled for the $j^{th}$ sampling section of the plural sampling sections, wherein j is an integer of 1 or greater that differs from i.

According to this aspect, the time relationship is controlled by causing the relative time relationship between the $i^{th}$ graded output period of the driving circuit and the $i^{th}$ active period of the enable signal to differ from the relative time relationship between the $j^{th}$ graded output period of the driving circuit and the $j^{th}$ active period of the enable signal. This enables the relative time relationships between the graded output periods and the active periods of the enable signals output by the display driver to be adjusted such that the timing of the output period of the data signal relative to the active period of the enable signal is appropriate in each sampling section.

It is preferable that the control circuit causes the time relationships to differ by causing a timing of the $i^{th}$ active period of the enable signal to differ from a timing of the $j^{th}$ active period.

According to this aspect, the time relationships between the graded output period and the period in which each sampling section is enabled in the electro-optical panel can be adjusted by adjusting the timing of the active period of the enable signal output by the display driver.

It is preferable that the control circuit causes the time relationships to differ by causing the timing of the $i^{th}$ graded output period to differ from the timing of the $j^{th}$ graded output period.

According to this aspect, the time relationships between the graded output period of the period in which each sampling section is enabled in the electro-optical panel can be adjusted by adjusting the timing of the graded output period of the data signal output by the display driver.

It is also preferable to further include a measuring circuit that measures a change in potential of the data signal when the enable signal was active, and for the control circuit to set the time relationships based on a measurement result by the measuring circuit.

According to this aspect, the delay time of the enable signal in each sampling section can be measured by measuring the change in potential of the data signal. A measuring circuit can accordingly be provided to the display driver by using this method to measure the change in potential of the data signal. This enables the time relationships between the graded output period and the active period of the enable signal in various general purpose electro-optical panels to be adjusted without the need to prepare a special electro-optical panel provided with a measuring circuit.

It is also preferable that the measuring circuit measures a change in potential of the data signal in a vertical retrace period.

According to this aspect, the delay of the enable signal can be measured in the vertical retrace period, which is a non-display period of the image.

It is also preferable to further include plural output terminals configured to output plural data signals that are output to the electro-optical panel, and for the measuring circuit to include a comparator circuit that is input with a determination voltage through a first input terminal, and a switch group that connects at least one output terminal of the plural output terminals to a second input terminal of the comparator circuit.

According to this aspect, at least one output terminal is connected to the second input terminal of the comparator circuit by the switch group, and the voltage of that second input terminal is compared against the determination voltage. This enables the change in voltage of the output terminal to be compared against the determination voltage, enabling the delay of the enable signal to be measured from the comparison result.

Another aspect relates to an electro-optical device including any of the display drivers described above and the electro-optical panel.

This other aspect preferable includes an enable signal output terminal that outputs the enable signal. Further, it is preferable that the electro-optical panel includes plural input terminals that are provided at a first end portion side of the electro-optical panel and that are input with the plural data signals, and an enable signal input terminal that is provided at a second end portion side of the electro-optical panel and that is input with the enable signal, the second portion end side being different from the first end portion side. Further, it is preferable that the control circuit causes a timing of the active period of the enable signal when the sampling operation is enabled for the sampling section at the second end portion side to be later than a timing of an active period of an enable signal when sampling operation is enabled for the sampling section at the first end portion side.

Yet another aspect relates to an electrical apparatus including any of the display drivers described by the above aspects.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferable embodiments of the invention are described in detail below. Note that the embodiments described below do not cause unwarranted restriction of the content of the invention described by the scope of the claims, and all of the configuration described by the embodiments is not essential in the solution of the invention.

1. Display Driver, Electro-Optical Panel

Figure 1:
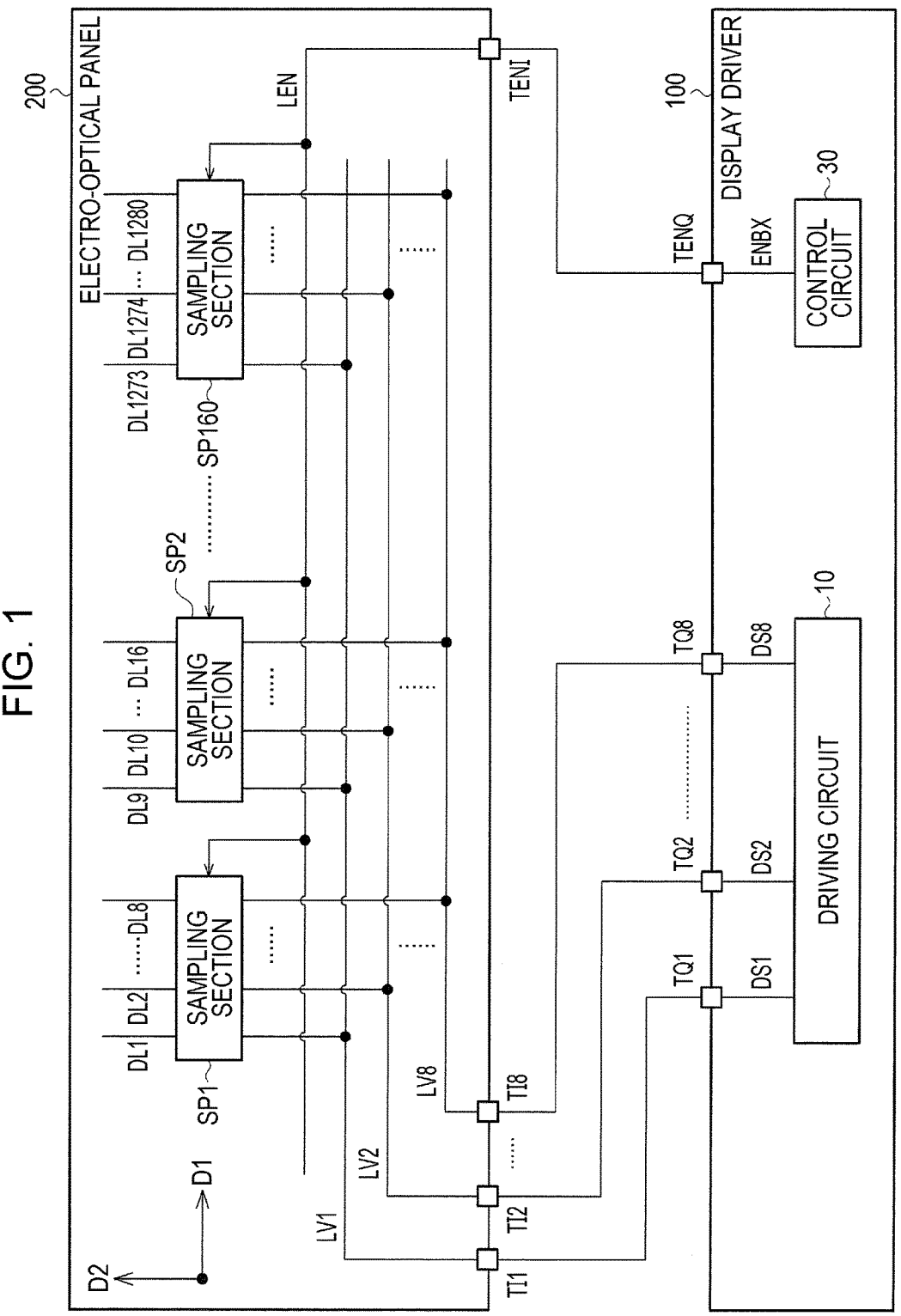
FIG. 1 is a configuration example of a display driver of an embodiment, and an electro-optical panel.

FIG. 1 illustrates a configuration example of a display driver 100 of an embodiment, and an electro-optical panel 200. The display driver 100 includes a driving circuit 10, a control circuit 30, plural output terminals TQ1 to TQn, and an enable signal output terminal TENQ. The electro-optical panel 200 (display panel) includes sampling sections SP1 to SP160, plural input terminals TI1 to TI8, and an enable signal input terminal TENI. Here, n is an integer of two or greater. Note that although a case in which n=8 is described as an example below, n is not limited to 8. Further, although a case in which the number of source lines of the electro-optical panel is 1280 is described as an example below, the number of source lines is not limited to this number.

The driving circuit 10 drives plural source lines DL1 to DL1280 of the electro-optical panel 200 sequentially at the predetermined number of lines at a time. The electro-optical panel 200 includes the plural sampling sections SP1 to SP160, each provided for the predetermined number of plural source lines. The control circuit 30 outputs an enable signal ENBX that enables a sampling operation of the plural sampling sections SP1 to SP160.

More specifically, the predetermined number of source lines in the sequential driving is eight (n), this being the same as the number of output terminals TQ1 to TQ8 of the display driver 100. Data lines LV1 to LV8 (video lines) are provided to the electro-optical panel 200, and the driving circuit 10 outputs data signals DS1 to DS8 to the data lines LV1 to LV8. Each sampling section includes eight transistors provided between the data lines LV1 to LV8 and the eight source lines, and connections between the data lines LV1 to LV8 and the eight source lines are controlled by the ON/OFF state of the transistor. For example, in cases in which the sampling operation of the sampling section SP1 is enabled, the transistor included in the sampling section SP1 is switched ON, the data lines LV1 to LV8 are connected to the source lines DL1 to DL8, and the source lines DL1 to DL8 are driven by the driving circuit 10 (the data signals DS1 to DS8 are supplied).

Figure 2:
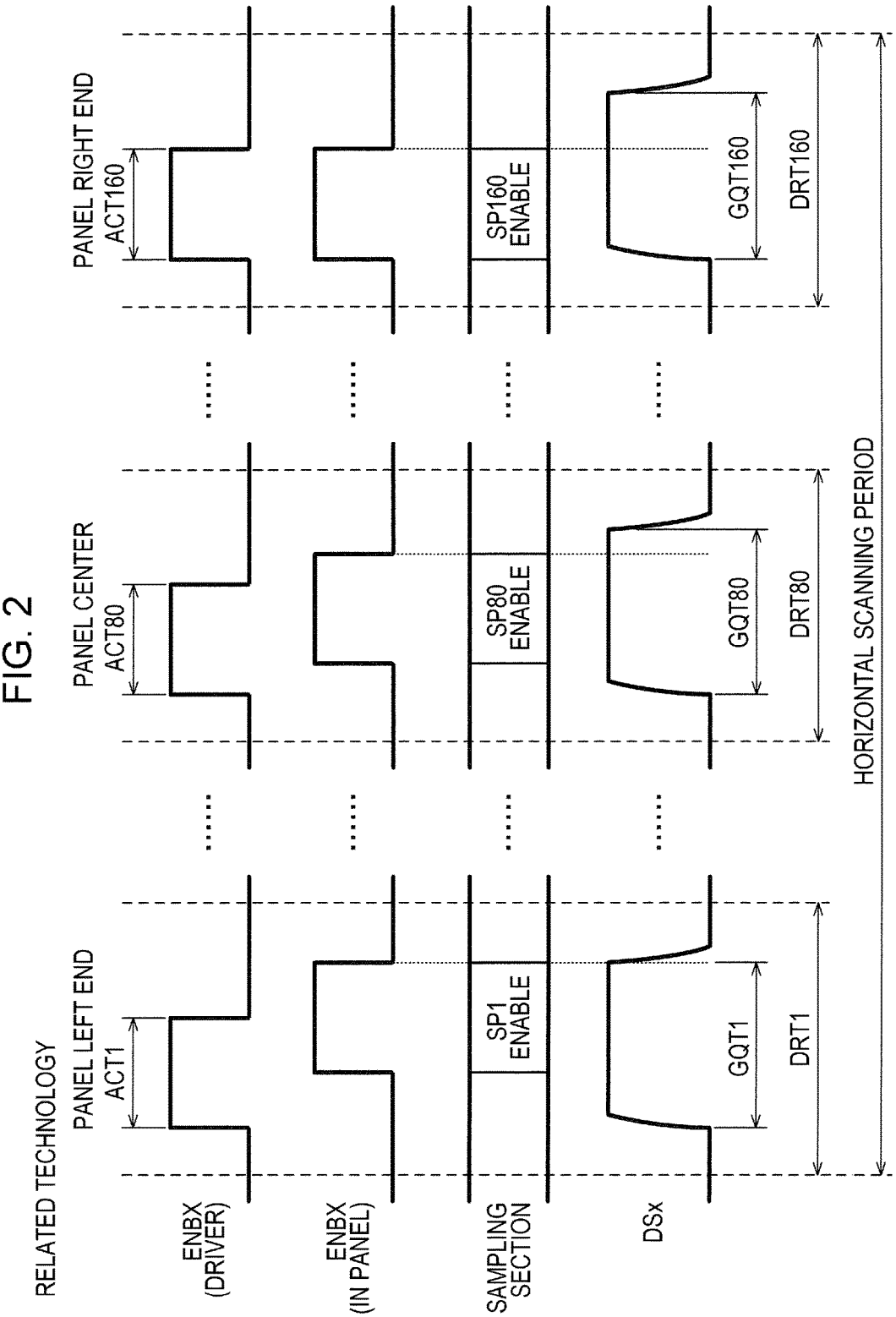
FIG. 2 is a timing chart to describe operation of a related display driver.

FIG. 2 is a timing chart to describe operation of a display driver of related technology. Note that the x of DSx is an integer of from 1 to 8, and DSx indicates one out of the data signals DS1 to DS8.

As illustrated in FIG. 2, 160 driving periods, DRT1 to DRT160, are included in one horizontal scanning period. One driving period is a period in which eight source lines (eight pixels) are driven by phase expansion driving, and one horizontal scan line is driven by repeating this 160 times. FIG. 2 illustrates an example in which the driving periods DRT1, DRT80, and DRT160 correspond to the left end, center, and right end of a panel. Here, as illustrated in FIG. 1, the horizontal scanning direction of the electro-optical panel 200 is a first direction D1 and a direction orthogonal thereto (intersecting therewith) is a second direction D2. The panel left end is the end at a −D1 side of the electro-optical panel 200 and the panel right end is an end at a +D1 side of the electro-optical panel 200.

The enable signal ENBX is active (has a first logical level, for example, a high level) in the active period ACT1 of the driving period DRT1 and the corresponding sampling section SP1 performs a sampling operation in the active period ACT1. Similarly, active periods ACT2 to ACT160 in which the sampling sections SP2 to SP160 perform sampling operations are provided to the equivalent driving periods DRT2 to DRT160.

As illustrated in FIG. 1, the sampling sections SP1 to SP160 and a signal line LEN of the enable signal ENBX are disposed along a first direction D1, and the enable signal ENBX propagates through the signal line LEN from the panel right end to the panel left end. Since the enable signal ENBX becomes increasingly delayed during propagation, the delay time of the enable signal ENBX when reaching each sampling section differs between the panel left end and the panel right end. More specifically, as illustrated in FIG. 2, the delay is large at the panel left end and the delay is small at the panel right end.

The enable signal ENBX generated by the display driver in related technology has a time spanning from the start of the driving period until the enable signal ENBX becomes active that is the same for each driving period. Thus, in each sampling section in the electro-optical panel 200, the actual timing at which the enable signal ENBX becomes active and the sample operation is enabled becomes later on progression toward the panel left end side. Namely, the period in which the sampling operation of the sampling section SP1 becomes enabled is relatively late at the panel left end with respect to a graded output period GQT1 in which data signals DS1 to DS8 are output, and a period in which a sampling operation of the sampling section SP160 is enabled is relatively early at the panel right end with respect to a graded output period GQT160 in which data signals DS1 to DS8 are output.

For example, the active period ACT1 of the enable signal ENBX is set such that at the panel left end the timing of the end of the sampling operation of the sampling section SP1 aligns with the timing of the end of the graded output period GQT1. In such cases, the sampling operation starts from when the data signal DSx settles at the panel left end. On the other hand, at the panel right end, there is a possibility that the sampling operation will start before the data signal DSx settles due to the timing of the start of the sampling operation of the sampling section SP160 being earlier. In such cases, there is a possibility that actual durations of writing to pixels will be shorter in the vicinity of the panel right end than at the panel left end, lowering the display quality (with, for example, display unevenness occurring).

Such a problem of a delay difference of the enable signal ENBX in one horizontal scanning period becomes more significant with progress to increasingly high pixel densities. Namely, the greater the number of pixels, the shorter the active period of the enable signal ENBX and the graded output period, increasing the liability of influence by the delay difference.

Figure 3:
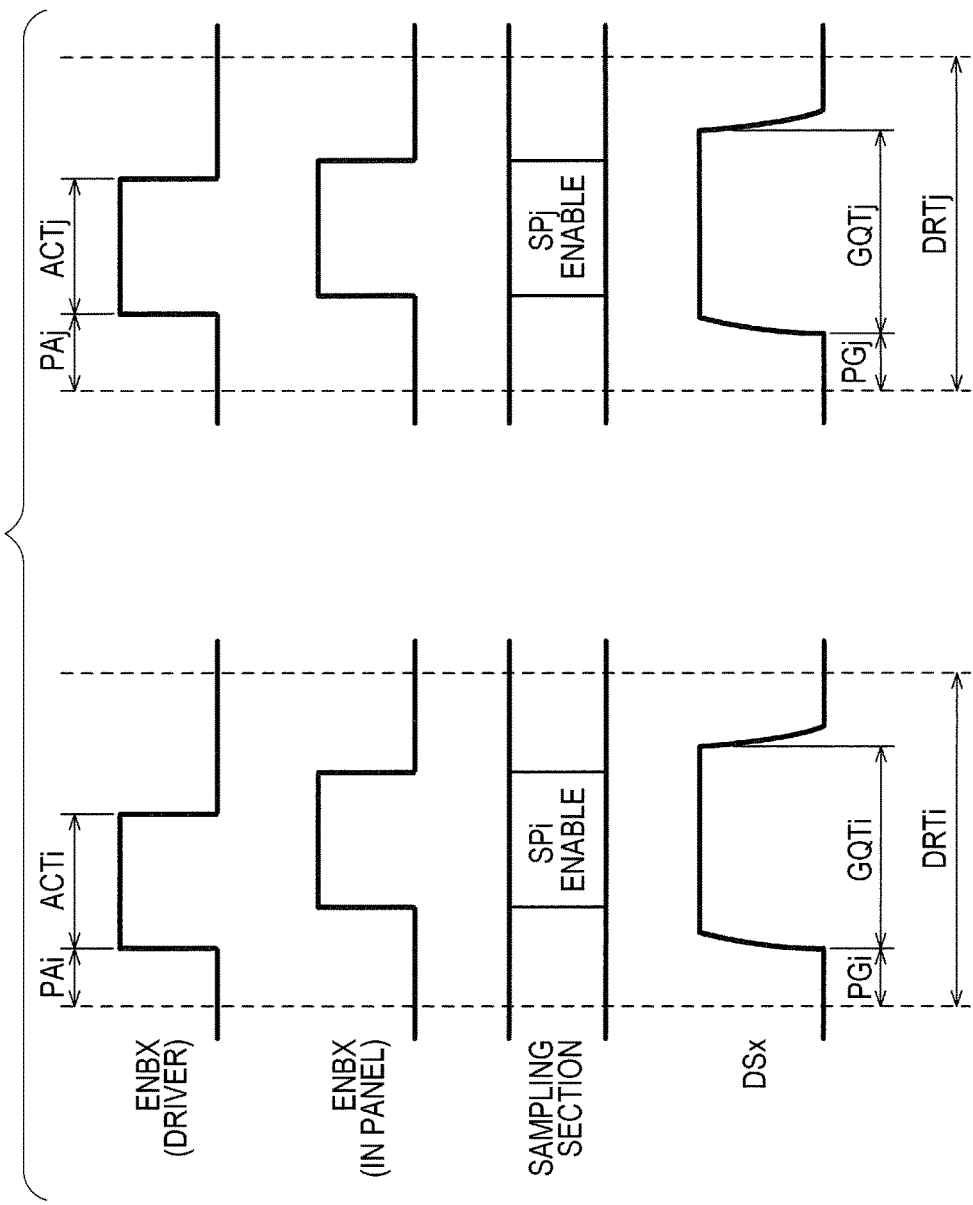
FIG. 3 is a timing chart to describe operation of a display driver of an embodiment.
Figure 4:
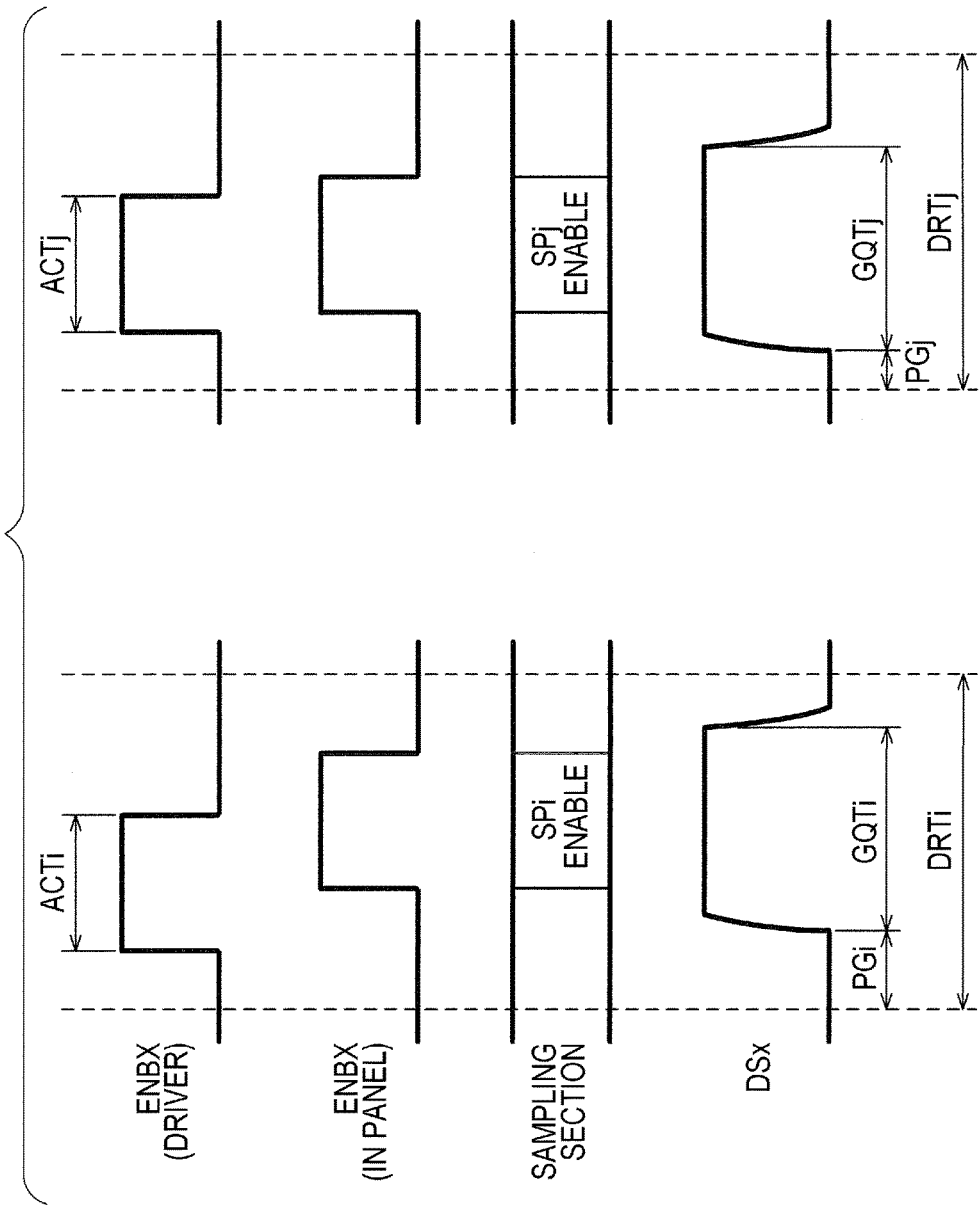
FIG. 4 is a timing chart to describe operation of a display driver of an embodiment.

FIG. 3 and FIG. 4 are timing charts to describe operation of the display driver 100 of the present embodiment.

To solve this problem, in the present embodiment, a relative time relationship between the active period of the enable signal ENBX and the graded output period is caused to differ within the horizontal scanning period. More specifically, as illustrated in FIG. 3, the control circuit 30 causes a relative time relationship between the $i^{th}$ active period ACTi of the enable signal ENBX and the $i^{th}$ graded output period GQTi of the driving circuit 10 to differ from a relative time relationship between the $j^{th}$ active period ACTj of the enable signal ENBX and the $j^{th}$ graded output period GQTj of the driving circuit 10. The $i^{th}$ active period ACTi is the active period in which the sampling operation of the $i^{th}$ sampling section SPi is enabled, and the $j^{th}$ active period ACTj is the active period in which the sampling operation of the $j^{th}$ sampling section SPj is enabled. Note that i and j are integers of from 1 to 160, and i≠j. Note that although FIG. 3 illustrates a case in which i<j, i may be greater than j.

More specifically, the periods spanning form the start of the driving periods DRTi and DRTj until the start of the active periods ACTi and ACTj are denoted PAi and PAj, and the time periods spanning from the start of the driving periods DRTi and DRTj until the start of the graded output periods GQTi and GQTj are denoted PGi and PGj. The differences between these periods, PAi−PGi and PAi−PGj, are then made different from each other. As illustrated in FIG. 3, setting is made such that PAi−PGi<PAi−PGj when i<j. Each of these periods is set in accordance with the extent to which the enable signal ENBX (or the data signals DS1 to DS8) is delayed within the electro-optical panel 200. Namely, the sampling operation is enabled after the data signal DSx has settled in each sampling section, and each period is set such that the sampling operation finishes before the graded output period ends. The length of each period is, for example, pre-set by measurements made when the electro-optical device was manufactured or the like. Alternatively, the display driver 100 may be set by measurements made when a power source is switched ON or the like.

For example, the control circuit 30 includes a timing controller and the timing controller controls the length of each of the periods based on a count value of a clock counter. For example, the control circuit 30 includes a register set with the length of the period (a count value), and the length of the period is changed by changing the setting value in the register. For example, a processing device (such as a CPU) external to the display driver 100 may write the setting value of the length of the period in the register. Alternatively, configuration may be made such that the setting value of the length of the period is generated by the display driver 100 and the setting value is written to the register.

According to the present embodiment, the relative time relationship between the active period of the enable signal ENBX output by the display driver 100 and the graded output period can be adjusted so to give an appropriate relative time relationship between the active period of the enable signal ENBX when actually reaching each sampling section and the graded output period. This enables actual durations of writing to pixels at the left and right of the panel to be made the same as each other, enabling a lowering in display quality to be prevented.

Further, in cases of related technology, such as that of FIG. 2, the active period of the enable signal ENBX needs to be shortened in order to constrain the active period of the enable signal ENBX to within the graded output period at the left and right of the panel. With regard to this point, according to the present embodiment, the delay difference of the enable signal ENBX at the panel left and right is adjusted such that the active period of the enable signal ENBX does not need to be shortened, making it easier to maintain the driving time of the pixels.

As illustrated in FIG. 3, the control circuit 30 makes the above described time relationships different by making the timing of the $i^{th}$ active period ACTi and the $j^{th}$ active period ACTj of the enable signal ENBX different. Namely, the control circuit 30 makes the period PAi different from the period PAj. For example, setting is made such that PAi<PAj in cases in which i<j.

According to the present embodiment, a time relationship between the graded output period and the periods in which each sampling section in the electro-optical panel 200 becomes enabled can be adjusted by adjusting the timing of the active period of the enable signal ENBX output by the display driver 100.

Alternatively, as illustrated in FIG. 4, the control circuit 30 may cause the time relationships described above to differ by making the timings of the $i^{th}$ graded output period GQTi and $j^{th}$ the graded output period GQTj different. Namely, the control circuit 30 can make the period PGi different from the period PGj. For example, setting may be made such that PGi>PGj in cases in which i<j.

According to the present embodiment, the time relationships between the graded output period and the period in which each sampling section in the electro-optical panel 200 becomes enabled can be adjusted by adjusting the timing of the graded output period at which the data signals DS1 to DS8 are output by the display driver 100.

Further, in the present embodiment, as illustrated in FIG. 1, the electro-optical panel 200 includes the plural input terminals TI1 to TI8 and the enable signal input terminal TENI. The plural input terminals TI1 to TI8 are provided to a first end portion side of the electro-optical panel 200 and the plural data signals DS1 to DS8 are input from the plural output terminals TQ1 to TQ8. The enable signal input terminal TENI is provided to a second end portion side of the electro-optical panel 200, this being is different from the first end portion side, and the enable signal ENBX is input from the enable signal output terminal TENQ. The enable signal output terminal TENQ is a terminal that outputs the enable signal ENBX from the control circuit 30 to the electro-optical panel 200.

The control circuit 30 then makes the timing of the active period ACT1 of the enable signal ENBX at which the sampling operation of the sampling section SP1 at the first end portion side is enabled earlier than the active period ACT160 of the enable signal ENBX at which the sampling operation of the sampling section SP2 at the second end portion side is enabled. Namely, setting is performed such that PA1<PA160.

Here, the first end portion side corresponds to the end portion side on the −D1 side and the second end portion side corresponds to the end portion side on the +D1 side in FIG. 1. The end portion sides are not limited to the ends (left and right ends) of the electro-optical panel 200 in the first direction D1, and may merely be closer to an end (in the vicinity of the end). For example, the input terminals TI1 to TI8 may be provided at the left edge (a lower left edge portion) of the electro-optical panel 200, at a lower left edge end thereof, or in the vicinity of a lower left end thereof. Further, the enable signal input terminal TENI may be provided at a right edge (a lower right edge portion) of the electro-optical panel 200, at a lower right edge end thereof, or in the vicinity of a lower right edge end of the electro-optical panel 200. Note that the left and right may be swapped.

According to the present embodiment, at the first end portion side, the delay time until the enable signal ENBX reaches the sampling section is large compared to the second end portion side, since the enable signal ENBX is input from the second end portion side and then propagates to the first end portion side. Accordingly, the timing of the active period ACT1 at the first end portion side is made earlier than the timing of the active period ACT160 at the second end portion side, thereby enabling the above delay time to be cancelled out. Note that there is no need to completely cancel out the delay time, as long as the period in which the sampling operation is enabled is within the graded output period (more accurately, within a period from after settling until the end of the graded output period).

Further, according to the present embodiment, the data signals DS1 to DS8 are input from the first end portion side and then propagate to the second end portion side. Input is performed from the end portion side that is the opposite to that of the enable signal ENBX in order to suppress coupling noise of the enable signal ENBX (digital signal) in the data signal. Since the data signals DS1 to DS8 and the enable signal ENBX accordingly propagate in opposite directions, a situation arises in which delay differences between the active period and the graded output period are likely to be created at the left and right of the panel. In the present embodiment, such delay differences can be dealt with by causing the relative time relationship between the active period and the graded output period to differ within the horizontal scanning period.

2. Measuring Circuit

Figure 5:
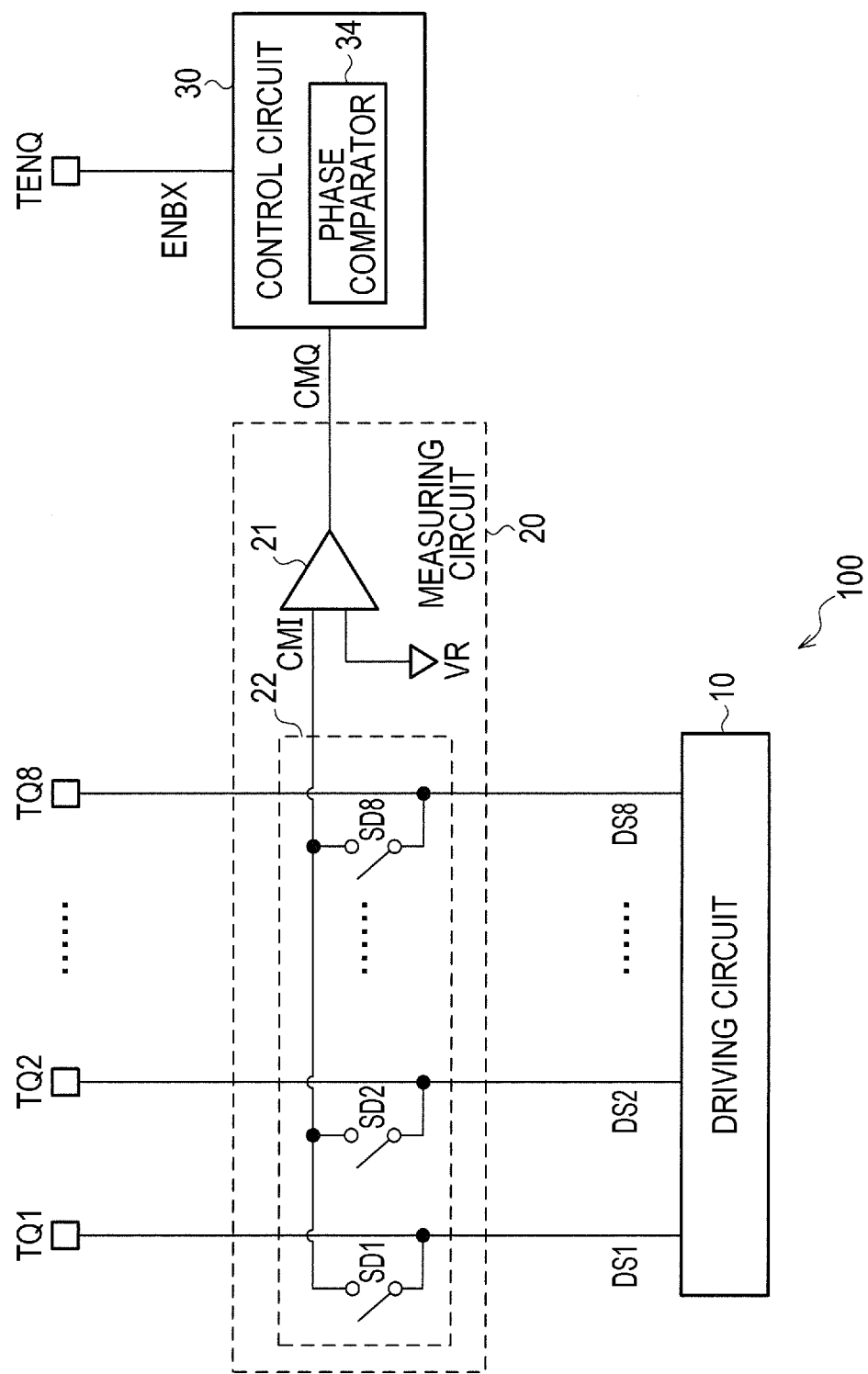
FIG. 5 is a second configuration example of a display driver of an embodiment.

FIG. 5 is a second configuration example of the display driver 100 of the present embodiment. The display driver 100 of FIG. 5 includes the driving circuit 10, a measuring circuit 20, the control circuit 30, the plural output terminals TQ1 to TQ8, and the enable signal output terminal TENQ.

The measuring circuit 20 measures changes in potential in the data signals DS1 to DS8 when the enable signal ENBX was made active. Then, the control circuit 30 sets the time relationships described above (the relative time relationship between the $i^{th}$ active period ACTi and the $i^{th}$ graded output period GQTi, and the relative time relationship between the $j^{th}$ active period ACTj and the $j^{th}$ graded output period GQTj) based on the results measured by the measuring circuit 20.

When the enable signal ENBX becomes active and the sampling operation of the sampling section is enabled, the data lines LV1 to LV8 are connected to the eight source lines. When this occurs, the potentials of the data lines LV1 to LV8 change due to the potential of the connected source line (the charge stored by the capacitance of the source line). Namely, this change in potential is generated at the timing at which the enable signal ENBX that has reached the sampling section has become active. In the present embodiment, the delay time of the enable signal ENBX in each sampling section can be measured by measuring the change in potential in the data signals DS1 to DS8.

Further, using the method of measuring the change in potential of the data signals DS1 to DS8 obviates the need to measure the delay of the enable signal ENBX inside the electro-optical panel 200, and thereby enables the measuring circuit 20 to be provided in the display driver 100. This obviates the need to prepare a special electro-optical panel provided with a measuring circuit, and enables the time relationship between the active period of the enable signal ENBX and the graded output period to be adjusted in various general purpose electro-optical panels.

Further, in the present embodiment, the measuring circuit 20 measures the change in potential of the data signals DS1 to DS8 during the vertical retrace period. Here, the vertical retrace period is an image non-display period in a vertical scanning period. Namely, the vertical retrace period is a period spanning from the end of an effective period in which the image is displayed (in which the horizontal scan lines of the electro-optical panel 200 are driven sequentially) in one vertical scanning period until the start of the effective period in which the image is displayed in the next vertical scanning period.

Such a configuration enables the delay of the enable signal ENBX to be measured in the vertical retrace period, which is an image non-display period. Although plural periods corresponding to horizontal scanning periods are included in the vertical retrace period, the delay of the enable signal ENBX can be measured when the sampling sections of the sampling sections SP1 to SP160 are enabled sequentially in the period corresponding to the given horizontal scanning period.

In the present embodiment, the plural output terminals TQ1 to TQ8 output the plural data signals DS1 to DS8 to be output to the electro-optical panel 200. The measuring circuit 20 then includes a comparator circuit 21 that is input with a determination voltage VR (reference voltage) through a first input terminal (one out of a positive terminal or a negative terminal), and a switch group 22 to connect the output terminal of at least one out of the plural output terminals TQ1 to TQ8 to a second input terminal of the comparator circuit 21 (the other out of the positive terminal and the negative terminal).

More specifically, the switch group 22 includes switches SD1 to SD8. One end of each switch SD1 to SD8 is connected to one of the output terminals TQ1 to TQ8, and the other end thereof is connected to the second input terminal of the comparator circuit 21. The switches SD1 to SD8 are, for example, transistors that are ON/OFF controlled by the control circuit 30. All of the switches SD1 to SD8 may be ON during measurement, or just a portion of the switches (for example, any one switch) may be switched ON during measurement. The determination voltage VR is, for example, supplied from a voltage generating circuit 50 of FIG. 8.

According to the present embodiment, at least one output terminal is connected to the second input terminal of the comparator circuit 21 by the switch group 22, and a voltage CMI of the second input terminal is compared against the determination voltage VR. This enables a voltage change of the output terminal to be compared against the determination voltage VR, and enables the delay of the enable signal ENBX to be measured (enables delay time information to be acquired) from the comparison result.

Further, in the present embodiment, the control circuit 30 includes a phase comparator 34. The phase comparator 34 detects a phase difference (time) between the timing at which the active period of the enable signal ENBX starts and the timing at which the logical level of an output signal CMQ (a measurement result of the measuring circuit 20) of the comparator circuit 21 changes. The control circuit 30 sets the timing of the active period of the enable signal ENBX or the graded output period based on the detected phase difference.

Alternatively, as described later, the delay time of the data signals DS1 to DS8 in the electro-optical panel 200 may also be measured. In such cases, the phase comparator 34 detects the phase difference (time) between the timing at which the graded output period starts and the timing at which the logical level of the output signal CMQ of the comparator circuit 21 changes. The control circuit 30 sets the timing of the active period of the enable signal ENBX or the graded output period based on the detected phase difference.

Note that configuration may be made such that both the delay of the enable signal ENBX and the delays of the data signals DS1 to DS8 are measured and the timing of the active period of the enable signal ENBX or the graded output period is set based on these measurements. Alternatively, configuration may be made such that either the delay of the enable signal ENBX or the delay of the data signals DS1 to DS8 is measured and the timing of the active period of the enable signal ENBX or the graded output period is set based on that measurement.

Figure 6:
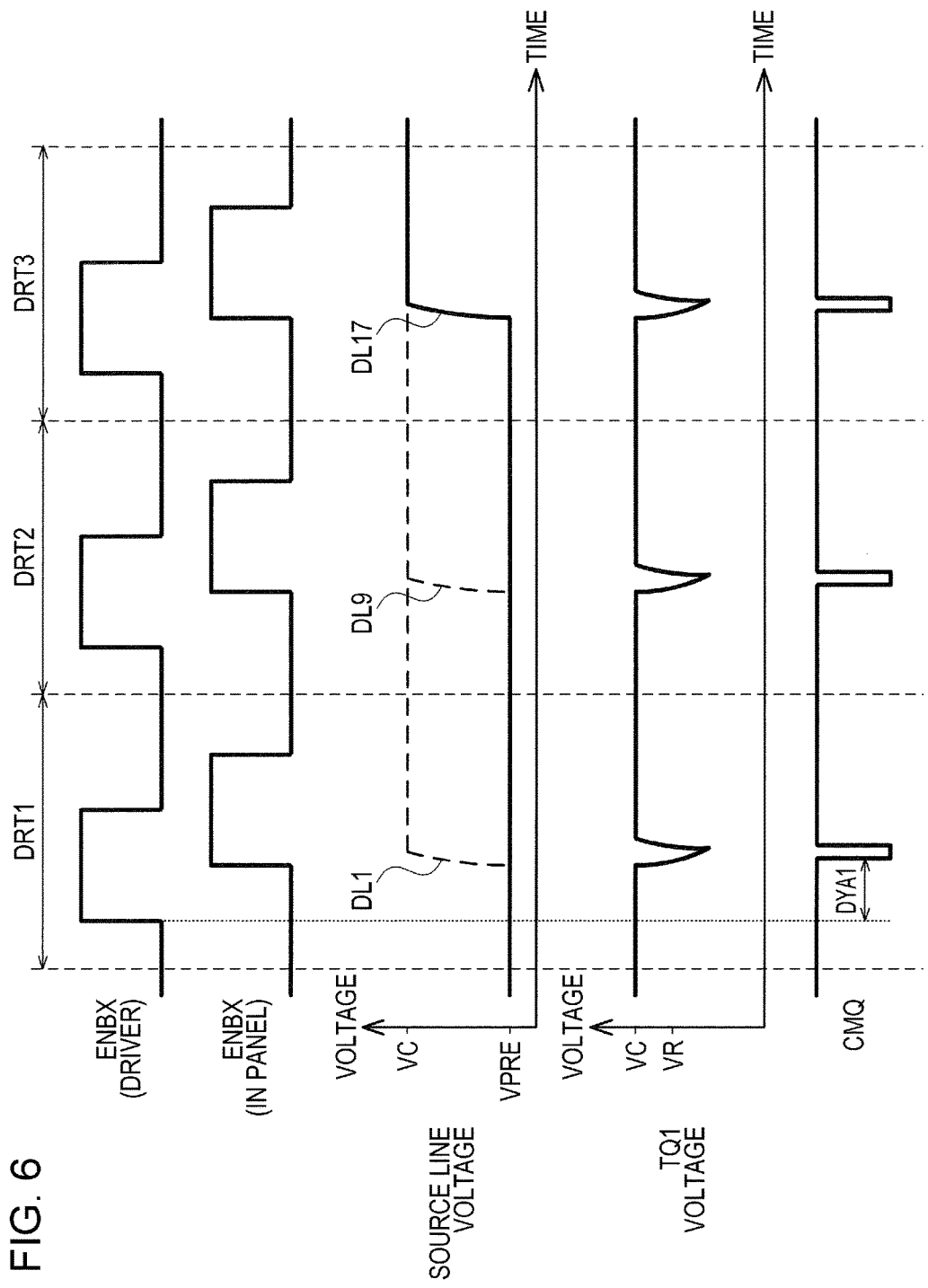
FIG. 6 is a timing chart to describe operation of a display driver when measuring a delay of an enable signal.

FIG. 6 is a timing chart to describe operation of the display driver 100 in cases in which the delay of the enable signal ENBX is measured. Note that although a voltage waveform of the output terminal TQ1 is illustrated in FIG. 6, similar applies to the voltage waveforms of the output terminals TQ2 to TQ8. Further, although the voltage waveforms of the source lines DL1, DL9, and DL17 are illustrated in FIG. 6, similar applies to the voltage waveforms of the source lines DL2 to DL8, DL10 to DL16, and DL18 to DL24.

First, before starting the delay measurement, the driving circuit 10 writes a pre-charge voltage VPRE to the source lines DL1 to DL1280. When delay measurement is started, the driving circuit 10 outputs the data signals DS1 to DS8 to the data lines LV1 to LV8 at a predetermined voltage VC (for example, at a common voltage), and the voltage of the output terminals TQ1 to TQ8 becomes the predetermined voltage VC. The control circuit 30 makes the enable signal ENBX active in the driving period DRT1, and the source lines DL1 to DL8 are connected to the data signals DS1 to DS8 by the sampling section SP1. At this time, the source lines DL1 to DL8, which are at the pre-charge voltage VPRE, are driven at the predetermined voltage VC by the driving circuit 10 such that the voltage of the output terminals TQ1 to TQ8 is transiently lowered and then returns to the predetermined voltage VC.

The measuring circuit 20 compares the voltage of the output terminals TQ1 to TQ8 against the determination voltage VR and outputs the signal CMQ, which is the comparison result, to the control circuit 30. The signal CMQ is at the first logical level (for example, high level) when the voltage of the output terminals TQ1 to TQ8 is greater than the determination voltage VR, and the signal CMQ is at the second logical level (for example, low level) when the voltage of the output terminals TQ1 to TQ8 is less than the determination voltage VR. The phase comparator 34 detects a phase difference DYA1 between the timing at which the enable signal ENBX transitions from low level (non-active) to high level (active) and the timing at which the signal CMQ transitions from high level to low level.

The above measurement is repeated for the driving periods DRT2, DRT3, and so on to detect the phase difference of each driving period. Note that the phase differences may be detected for all of the driving periods DRT1 to DRT160, or the phase differences may be detected for only a portion of the driving periods out of the driving periods DRT1 to DRT160.

Figure 7:
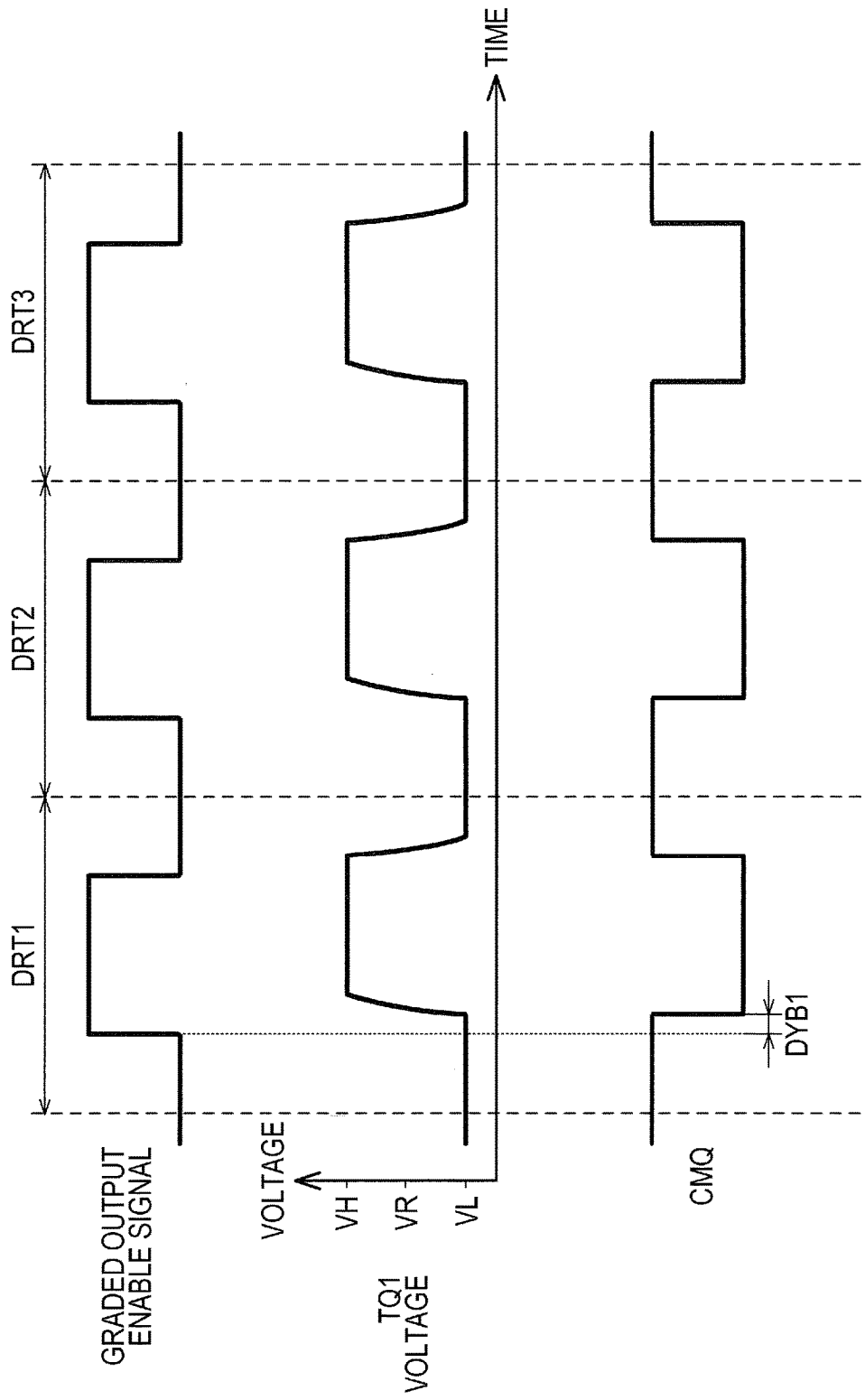
FIG. 7 is a timing chart to describe operation of a display driver when measuring a delay of a data signal.

FIG. 7 is a timing chart to describe operation of the display driver 100 when the delay of the data signals DS1 to DS8 is measured. Note that although the voltage waveform of the output terminal TQ1 is illustrated in FIG. 7, similar applies to the voltage waveforms of the output terminals TQ2 to TQ8.

The control circuit 30 makes the graded output enable signal active (for example, high level) in each driving period. The driving circuit 10 drives the data lines LV1 to LV8 in the active period of the graded output enable signal. When measuring the delay of the data signals DS1 to DS8, the driving circuit 10 outputs the voltage VL (for example, a voltage corresponding to the lowest gradation) in the non-active period of the graded output enable signal and outputs a voltage VH (for example, a voltage corresponding to the highest gradation) in the active period of the graded output enable signal.

The measuring circuit 20 compares the voltage of the output terminals TQ1 to TQ8 against the determination voltage VR (for example, a voltage corresponding to an intermediate gradation) and outputs the signal CMQ, which is the comparison result, to the control circuit 30. The signal CMQ is the first logical level (for example, high level) when the voltage of the output terminals TQ1 to TQ8 is lower than the determination voltage VR, and the signal CMQ is the second logical level (for example, low level) when voltage of the output terminals TQ1 to TQ8 is greater than the determination voltage VR. The phase comparator 34 detects the phase difference DYB1 between the timing at which the graded output enable signal transitions from the low level (non-active) to the high level (active) and the timing at which the signal CMQ transitions from the high level to the low level.

The above measurement is repeated for the driving periods DRT2, DRT3, and so on to detect the phase difference of each driving period. Note that the phase difference may be detected for all of the driving periods DRT1 to DRT160, or the phase difference may be detected for just a portion of the driving periods out of the driving periods DRT1 to DRT160.

3. Electro-Optical Device

Figure 8:
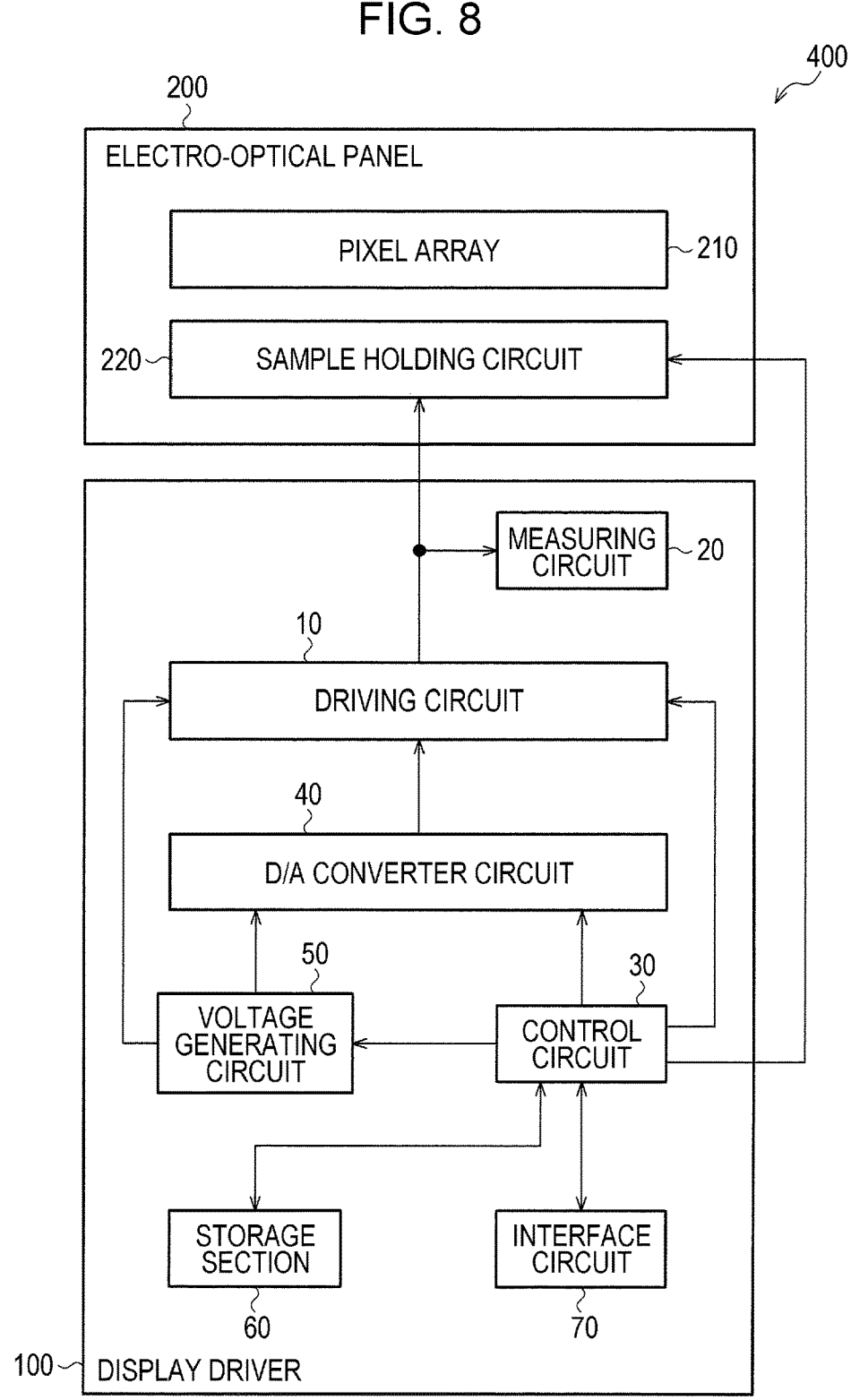
FIG. 8 is a configuration example of an electro-optical device.

FIG. 8 is a configuration example of an electro-optical device 400 (display device) that includes the display driver 100 of the present embodiment. The electro-optical device 400 includes the display driver 100 and the electro-optical panel 200. The display driver 100 includes the driving circuit 10, the measuring circuit 20, the control circuit 30, a D/A converter circuit 40, the voltage generating circuit 50, a storage section 60 (memory), and an interface circuit 70. The electro-optical panel 200 includes a pixel array 210 and a sample holding circuit 220. The pixel array 210 is configured from plural pixels, connected to the source lines DL1 to DL1280 of FIG. 1, arranged in an array. The sample holding circuit 220 corresponds to the sampling sections SP1 to SP160 of FIG. 1.

Figure 9:
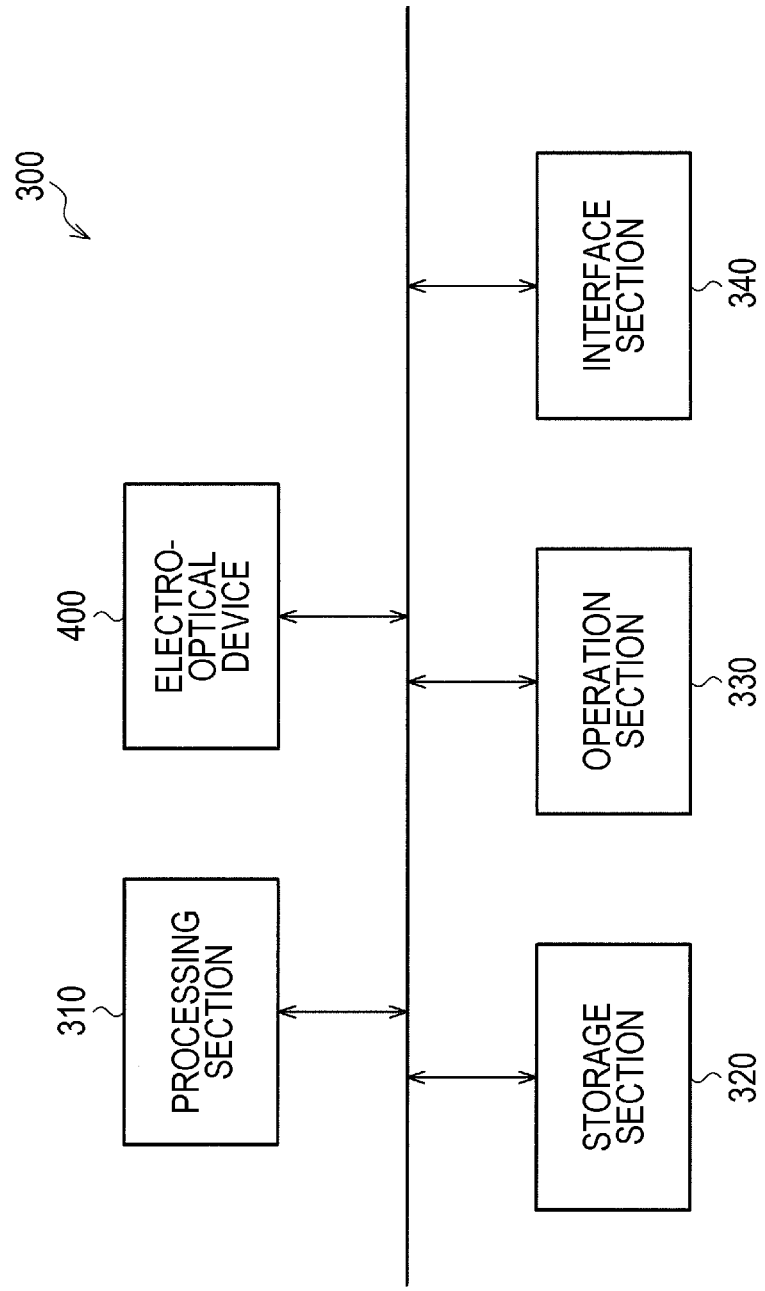
FIG. 9 is a configuration example of an electrical apparatus.

The interface circuit 70 places the display driver 100 in communication with an external processing device (for example, a processing section 310 of FIG. 9). For example, a clock signal or display data is input from the external processing device to the control circuit 30 via the interface circuit 70.

The control circuit 30 controls each section of the display driver 100 based on the clock signal and display data input via the interface circuit 70. For example, the control circuit 30 controls a display timing such as selection of a horizontal scan line of the pixel array 210 or vertical synchronization control, and controls the driving circuit 10 in accordance with the display timing.

The voltage generating circuit 50 generates various voltages and outputs the generated voltages to the driving circuit 10 and the D/A converter circuit 40. For example, the voltage generating circuit 50 includes a graded voltage generation circuit that generates plural voltages (for example, a resistor ladder), a power source circuit that generates a power source for an amplifier circuit of the driving circuit 10, a voltage generation circuit that generates the determination voltage VR of the measuring circuit 20, and the like.

The D/A converter circuit 40 D/A converts the display data from the control circuit 30 and outputs the D/A converted voltage to the driving circuit 10. Namely, a voltage corresponding to the display data is selected from out of the plural voltages supplied from the graded voltage generation circuit of the voltage generating circuit 50, and the selected voltage is output to the driving circuit 10.

The driving circuit 10 amplifies the voltage from the D/A converter circuit 40 using the amplifier circuit, and drives the pixels of the electro-optical panel 200 using the amplified voltage. Note that the driving circuit 10 may perform digitally assisted driving or capacitive driving. In digitally assisted driving, a data voltage is changed to an index voltage by connecting an output terminal to the power source during a predetermined period using a transistor having a drive power corresponding to the gradation difference between previous display data and the next display data. The amplifier circuit then amplifies and outputs the voltage from the D/A converter circuit 40. In the capacitive driving, the data voltage is changed to an index voltage by redistributing charge between the capacitance of the data lines and pixels and the capacitance of the driving circuit, at a charge quantity in accordance with the display data. The amplifier circuit then amplifies and outputs the voltage from the D/A converter circuit 40. Note that driving by the amplifier circuit may be omitted from the digitally assisted driving and capacitive driving.

The storage section 60 stores various data employed to control the display driver 100 (for example, setting data) and the like. For example, the storage section 60 is configured by non-volatile memory or RAM (such as SRAM or DRAM).

4. Electrical Apparatus

FIG. 9 is a configuration example of an electrical apparatus 300 including the display driver 100 of the present embodiment. Specific conceivable examples of the electrical apparatus 300 include various electrical apparatuses mounted with a display device, such as a projector or head-mounted display, a portable information terminal, a vehicle on-board device (such as an instrument panel or a car navigation system), a portable game terminal, or an information processing device.

The electrical apparatus 300 includes a processing section 310 (for example, a processor such as a CPU, or a gate array), a storage section 320 (for example, memory, a hard disk, or the like), an operation section 330 (operation device), an interface section 340 (an interface circuit or an interface device), and the electro-optical device 400 (a display). The electro-optical device 400 includes the display driver 100 and the electro-optical panel 200 as illustrated in FIG. 8.

The operation section 330 is a user interface that receives various operations from a user. For example, the operation section 330 is a button and a mouse, a keyboard, or a touch panel or the like installed to the electro-optical device 400 (electro-optical panel 200). The interface section 340 is a data interface that performs input and output of image data and control data. For example, a wired communication interface such as USB or a wireless communication interface such as wireless LAN. The storage section 320 stores data input from the interface section 340. Alternatively, the storage section 320 functions as working memory of the processing section 310. The processing section 310 processes display data input from the interface section 340 or stored in the storage section 320, and sends the processed display data to the electro-optical device 400 (the display driver 100). The electro-optical device 400 displays an image in a pixel array based on the display data sent from the processing section 310.

For example, when the electrical apparatus 300 is a projector, the electrical apparatus 300 further includes a light source and optical devices (for example, a lens, a prism, a mirror, and the like). When the electro-optical panel 200 is a transmission-type of panel, the optical devices cause light from the light source to be incident to the electro-optical panel 200 and like, and project light that has passed through the electro-optical panel 200 onto a screen (display section). When the electro-optical panel 200 is a reflection-type of panel, the optical devices cause light from the light source to be incident to the electro-optical panel 200, and project light that has been reflected from the electro-optical panel 200 onto a screen (display section).

Note that although details of the present embodiment have been described above, a person of ordinary skill in the art will be able to easily understand that many modifications are possible that do not substantially depart from the novel features and advantages effects of the invention. Accordingly, such modified examples are all encompassed in the scope of the invention. For example, terminology in the specification and the drawings that is used at least once together with different terminology having a broader definition or equivalent definition, may be substituted with the different terminology at any place in the specification and the drawings. Further, all combinations of the present embodiments and modified examples are also be included in the scope of the invention. Further, configurations, operations, and the like of the display driver, the electro-optical panel, the electro-optical device, the electrical apparatus, and the like are also not limited that described in the present embodiments, and various modified embodiments thereof are possible.

The entire disclosure of Japanese Patent Application No. 2016-157242, filed Aug. 10, 2016 is expressly incorporated by reference herein.

What is claimed is:

1. A display driver comprising:
a driving circuit that drives a plurality of source lines of an electro-optical panel sequentially at a predetermined number of lines at a time, the electro-optical panel including a plurality of sampling sections each provided to the predetermined number of lines of the plurality of source lines; and
a control circuit configured to:
output an enable signal that enables a sampling operation of the plurality of sampling sections; and
cause a relative time relationship between an $i^{th}$ graded output period of the driving circuit and an $i^{th}$ active period of the enable signal when the sampling operation is enabled for an $i^{th}$ sampling section of the plurality of sampling sections, where i is an integer of 1 or greater, to differ from a relative time relationship between a $j^{th}$ graded output period of the driving circuit and a $j^{th}$ active period of the enable signal when a sampling operation is enabled for a $j^{th}$ sampling section of the plurality of sampling sections, where j is an integer of 1 or greater that differs from i.

2. The display driver according to claim 1, wherein:
the control circuit is configured to cause the time relationships to differ by causing a timing of the $i^{th}$ active period of the enable signal to differ from a timing of the $j^{th}$ active period.

3. The display driver according to claim 1, wherein:
the control circuit is configured to cause the time relationships to differ by causing the timing of the $i^{th}$ graded output period to differ from the timing of the $j^{th}$ graded output period.

4. The display driver according to claim 1, further comprising:
a measuring circuit configured to measure a change in potential of a data signal when the enable signal was active,
wherein the control circuit is configured to set the time relationships based on a measurement result by the measuring circuit.

5. The display driver according to claim 4, wherein the measuring circuit is configured to measure a change in potential of the data signal in a vertical retrace period.

6. The display driver according to claim 4, further comprising:
a plurality of output terminals configured to output a plurality of the data signal to the electro-optical panel,
wherein the measuring circuit includes:
a comparator circuit that is input with a determination voltage through a first input terminal; and
a switch group that connects at least one output terminal of the plurality of output terminals to a second input terminal of the comparator circuit.

7. An electro-optical device comprising:
the display driver according to claim 1; and
the electro-optical panel.

8. An electro-optical device comprising:
play driver according to claim 2; and
the electro-optical panel.

9. An electro-optical device comprising:
play driver according to claim 3; and
the electro-optical panel.

10. An electro-optical device comprising:
the display driver according to claim 4; and
the electro-optical panel.

11. An electro-optical device comprising:
the display driver according to claim 5; and
the electro-optical panel.

12. An electro-optical device comprising:
the display driver according to claim 6; and
the electro-optical panel.

13. The electro-optical device according to claim 7, further comprising:
an enable signal output terminal that outputs the enable signal;
wherein the electro-optical panel includes:
a plurality of input terminals that are provided at a first end portion side of the electro-optical panel and that are input with the plurality of the data signal; and
an enable signal input terminal that is provided at a second end portion side of the electro-optical panel and that is input with the enable signal, the second portion end side being different from the first end portion side, and
the control circuit is configured to cause a timing of an active period of the enable signal when the sampling operation is enabled for the sampling section at the second end portion side to be later than a timing of an active period of an enable signal when sampling operation is enabled for the sampling section at the first end portion side.

14. An electrical apparatus comprising the display driver according to claim 1.

15. A display driver for driving an electro-optical panel that includes a plurality of source lines, a first sampling circuit, and a second sampling circuit, the first sampling circuit corresponding to a first predetermined number of lines of the plurality of source lines arranged near one side of the electro-optical panel, and the second sampling circuit corresponding to a second predetermined number of lines of the plurality of source lines arranged near the other side of the electro-optical panel, comprising:
- a driving circuit configured to output first data signals and second data signals, each first data signals being outputted to the first predetermined number of lines in a first output period, and each second data signals being outputted to the second predetermined number of lines in a second output period; and
- a control circuit configured to output a first enable signal having a first active period and a second enable signal having a second active period, the first enable signal enabling a sampling operation of the first sampling section in the first active period, and the second enable signal enabling a sampling operation of the second sampling section in the second active period,
- wherein a relative time relationship between the first output period and the first active period is different from a relative time relationship between the second output period and the second active period.

16. The display driver according to claim 15, wherein:
a timing of the first active period of the first enable signal is different from a timing of the second active period of the second enable signal.

17. The display driver according to claim 15, wherein:
a timing of the first output period of the first data signals is different from a timing of the second output period of the second data signals.

18. An electrical apparatus comprising the display driver according to claim 15.

* * * * *